United States Patent
Tomita et al.

(10) Patent No.: US 9,793,723 B2
(45) Date of Patent: Oct. 17, 2017

(54) STORAGE BATTERY CONTROL DEVICE AND STORAGE BATTERY CONTROL METHOD

(71) Applicant: Hitachi, Ltd., Tokyo (JP)

(72) Inventors: Taminori Tomita, Tokyo (JP); Yasuko Shiga, Tokyo (JP); Takaharu Ishida, Tokyo (JP); Michiki Nakano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 234 days.

(21) Appl. No.: 14/426,307

(22) PCT Filed: Nov. 19, 2012

(86) PCT No.: PCT/JP2012/079894
§ 371 (c)(1),
(2) Date: Mar. 5, 2015

(87) PCT Pub. No.: WO2014/076832
PCT Pub. Date: May 22, 2014

(65) Prior Publication Data
US 2015/0249350 A1 Sep. 3, 2015

(51) Int. Cl.
*H02J 7/00* (2006.01)
*H02J 3/32* (2006.01)
(Continued)

(52) U.S. Cl.
CPC ......... *H02J 7/0013* (2013.01); *H01M 10/441* (2013.01); *H01M 10/482* (2013.01); *H02J 3/32* (2013.01); *H02J 3/46* (2013.01); *H02J 7/007* (2013.01); *H02J 7/0022* (2013.01); H02J 3/381 (2013.01); H02J 3/383 (2013.01); H02J 3/387 (2013.01); H02J 7/34 (2013.01);
H02J 7/35 (2013.01); H02J 13/002 (2013.01); H02J 13/0075 (2013.01); Y02E 10/563 (2013.01);
(Continued)

(58) Field of Classification Search
CPC .................................. H02J 7/0013
USPC ......................... 320/128, 134–136
See application file for complete search history.

(56) References Cited

U.S. PATENT DOCUMENTS

2010/0023174 A1* 1/2010 Nagata ............... H02J 3/32
700/287
2012/0323387 A1 12/2012 Ozaki et al.

FOREIGN PATENT DOCUMENTS

CN 101682195 A 3/2010
JP 2008-099527 A 4/2008
(Continued)

OTHER PUBLICATIONS

PCT International Search Report on application PCT/JP2012/079894 dated Jan. 22, 2013; 1 page.

*Primary Examiner* — Richard V Muralidar
(74) *Attorney, Agent, or Firm* — Foley & Lardner LLP

(57) ABSTRACT

A plurality of storage battery modules include storage battery control devices that can mutually communicate with each other and obtain a demand for electric power in a predetermined consumer in which the plurality of storage battery modules are provided. The storage battery control devices mutually transmit and receive charging/discharging electric power of the storage batteries and control charging/discharging of the plurality of storage battery modules, respectively, on the basis of the demand for electric power in the predetermined consumer.

9 Claims, 9 Drawing Sheets

(51) Int. Cl.
*H02J 3/46* (2006.01)
*H01M 10/44* (2006.01)
*H01M 10/48* (2006.01)
*H02J 7/34* (2006.01)
*H02J 7/35* (2006.01)
*H02J 3/38* (2006.01)
*H02J 13/00* (2006.01)

(52) U.S. Cl.
CPC ............. *Y02E 10/566* (2013.01); *Y02E 40/72* (2013.01); *Y02E 60/722* (2013.01); *Y02E 60/7815* (2013.01); *Y02E 60/7853* (2013.01); *Y02E 70/30* (2013.01); *Y04S 10/12* (2013.01); *Y04S 10/123* (2013.01); *Y04S 10/14* (2013.01); *Y04S 40/121* (2013.01); *Y04S 40/126* (2013.01)

(56) References Cited

FOREIGN PATENT DOCUMENTS

| | | |
|---|---|---|
| JP | 2011-172334 A | 9/2011 |
| JP | 2012-055067 A | 3/2012 |
| WO | WO 2008/117392 A1 | 10/2008 |
| WO | WO 2012/128252 A1 | 9/2012 |

\* cited by examiner

[FIG. 1]
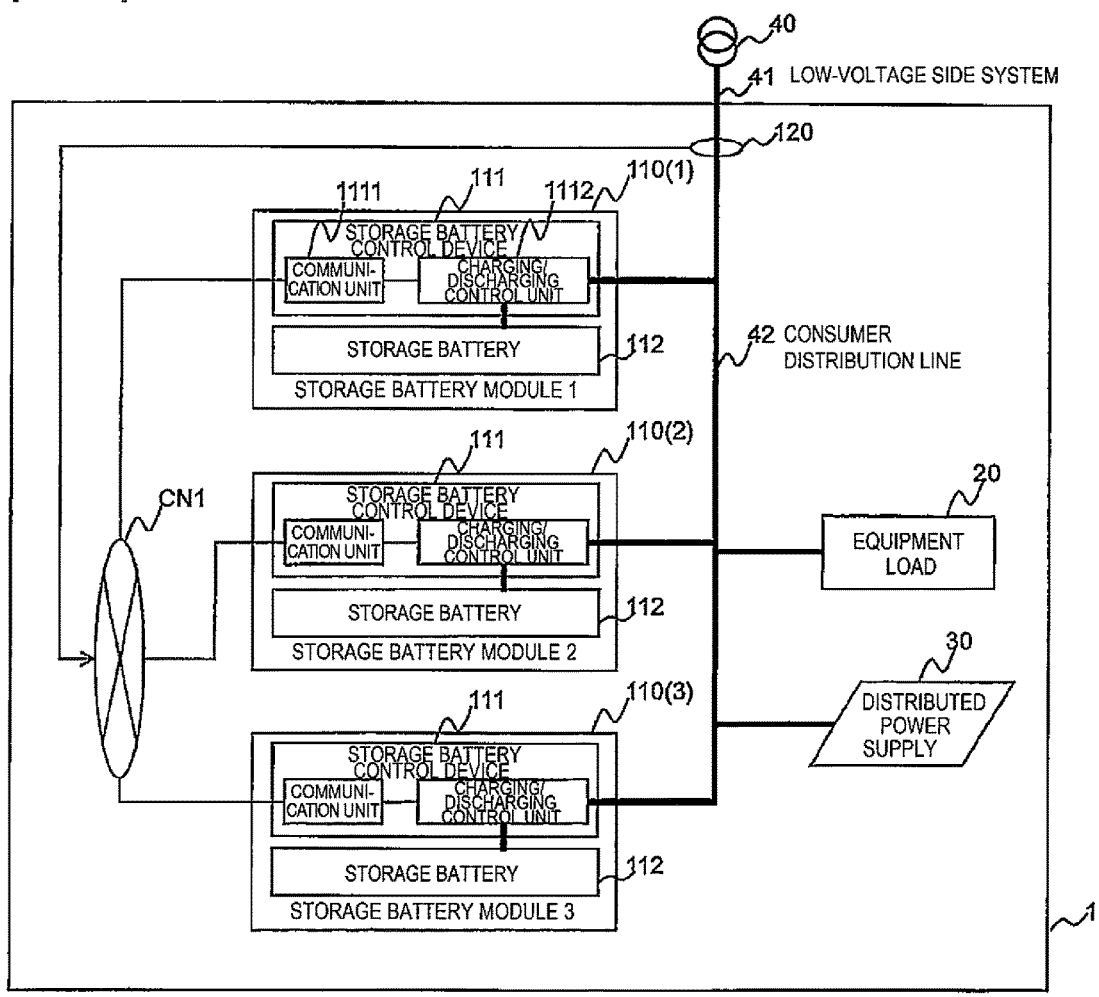

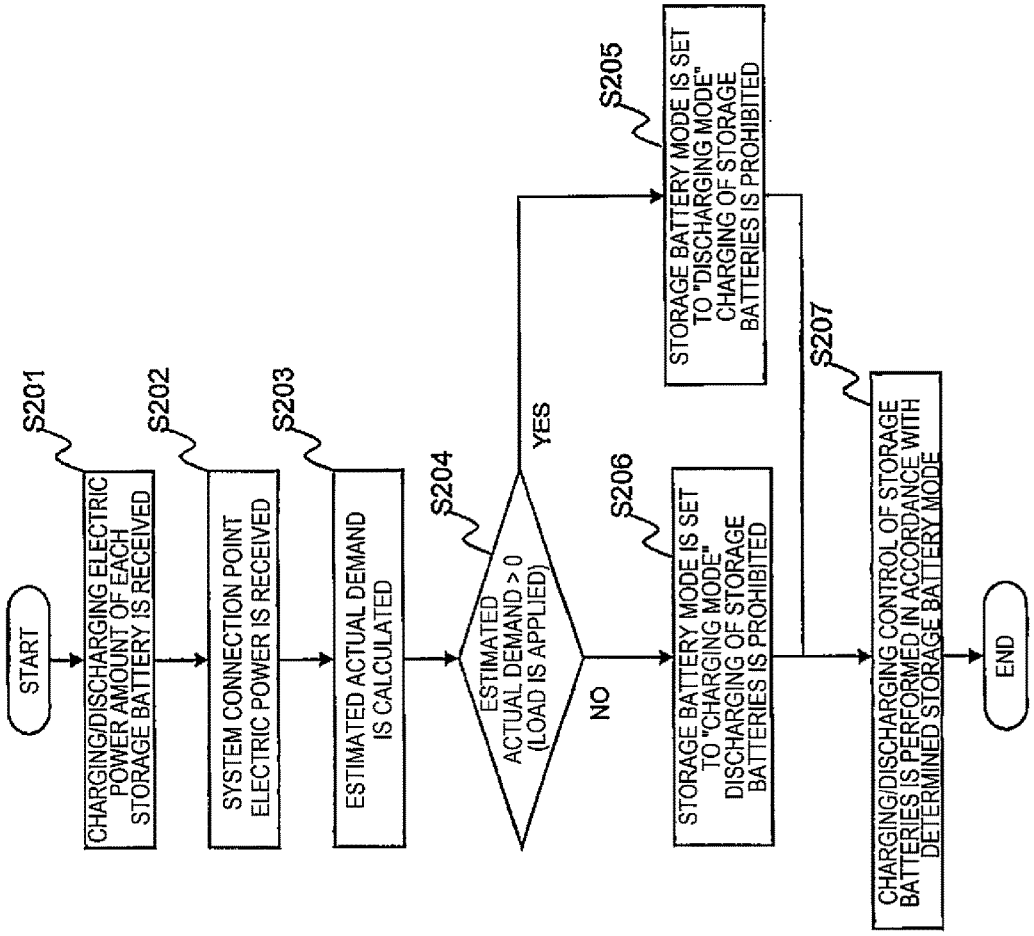
[FIG. 2]

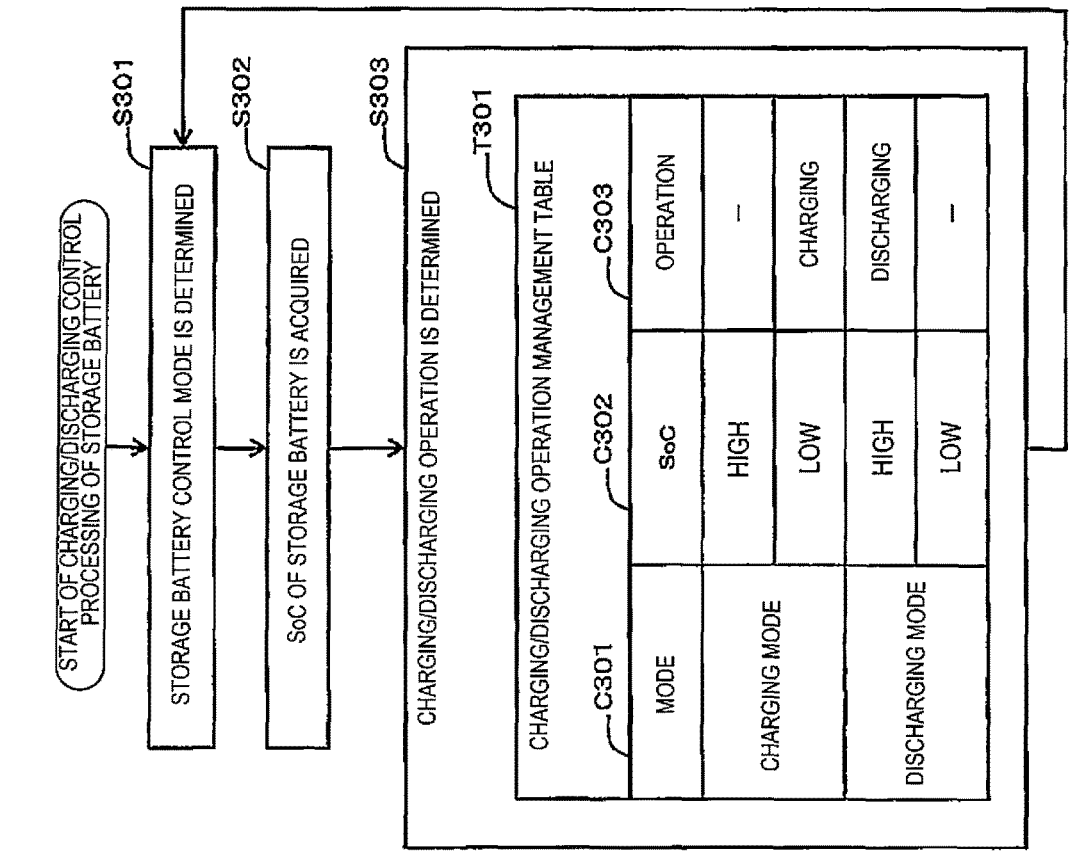
[FIG. 3]

[FIG. 4]

CHARGING/DISCHARGING OPERATION MANAGEMENT TABLE T401

| MODE (C401) | SoC (C402) | ELECTRICITY RATE EVALUATION (C403) | OPERATION (C404) |
|---|---|---|---|
| CHARGING MODE | F | HIGH | – |
| | F | LOW | – |
| | H | HIGH | – |
| | H | LOW | CHARGING (UNTIL F) |
| | L | HIGH | – |
| | L | LOW | CHARGING (UNTIL F) |
| | E | HIGH | CHARGING (UNTIL L) |
| | E | LOW | CHARGING (UNTIL F) |
| DISCHARGING MODE | F | HIGH | DISCHARGING (UNTIL E) |
| | F | LOW | DISCHARGING (UNTIL E) |
| | H | HIGH | DISCHARGING (UNTIL E) |
| | H | LOW | – |
| | L | HIGH | DISCHARGING (UNTIL E) |
| | L | LOW | – |
| | E | HIGH | – |
| | E | LOW | – |

[FIG. 5]

| ELECTRIC POWER RATE MANAGEMENT TABLE | | | T501 |
|---|---|---|---|
| C501 | C502 | C503 | |
| TIME ZONE | RATE | EVALUATION | |
| 0:00~0:59 | 8.0 YEN/kWh | LOW | |
| 1:00~1:59 | 8.0 YEN/kWh | LOW | |
| 2:00~2:59 | 8.0 YEN/kWh | LOW | |
| 3:00~3:59 | 8.0 YEN/kWh | LOW | |
| 4:00~4:59 | 8.0 YEN/kWh | LOW | |
| 5:00~5:59 | 8.0 YEN/kWh | LOW | |
| 6:00~6:59 | 8.0 YEN/kWh | LOW | |
| 7:00~7:59 | 8.0 YEN/kWh | LOW | |
| 8:00~8:59 | 24.0 YEN/kWh | HIGH | |
| 9:00~9:59 | 24.0 YEN/kWh | HIGH | |
| 10:00~10:59 | 24.0 YEN/kWh | HIGH | |
| 11:00~11:59 | 24.0 YEN/kWh | HIGH | |
| 12:00~12:59 | 24.0 YEN/kWh | HIGH | |
| 13:00~13:59 | 24.0 YEN/kWh | HIGH | |
| 14:00~14:59 | 24.0 YEN/kWh | HIGH | |
| 15:00~15:59 | 24.0 YEN/kWh | HIGH | |
| 16:00~16:59 | 24.0 YEN/kWh | HIGH | |
| 17:00~17:59 | 24.0 YEN/kWh | HIGH | |
| 18:00~18:59 | 24.0 YEN/kWh | HIGH | |
| 19:00~19:59 | 24.0 YEN/kWh | HIGH | |
| 20:00~20:59 | 8.0 YEN/kWh | LOW | |
| 21:00~21:59 | 8.0 YEN/kWh | LOW | |
| 22:00~22:59 | 8.0 YEN/kWh | LOW | |
| 23:00~23:59 | 8.0 YEN/kWh | LOW | |

[FIG. 6]
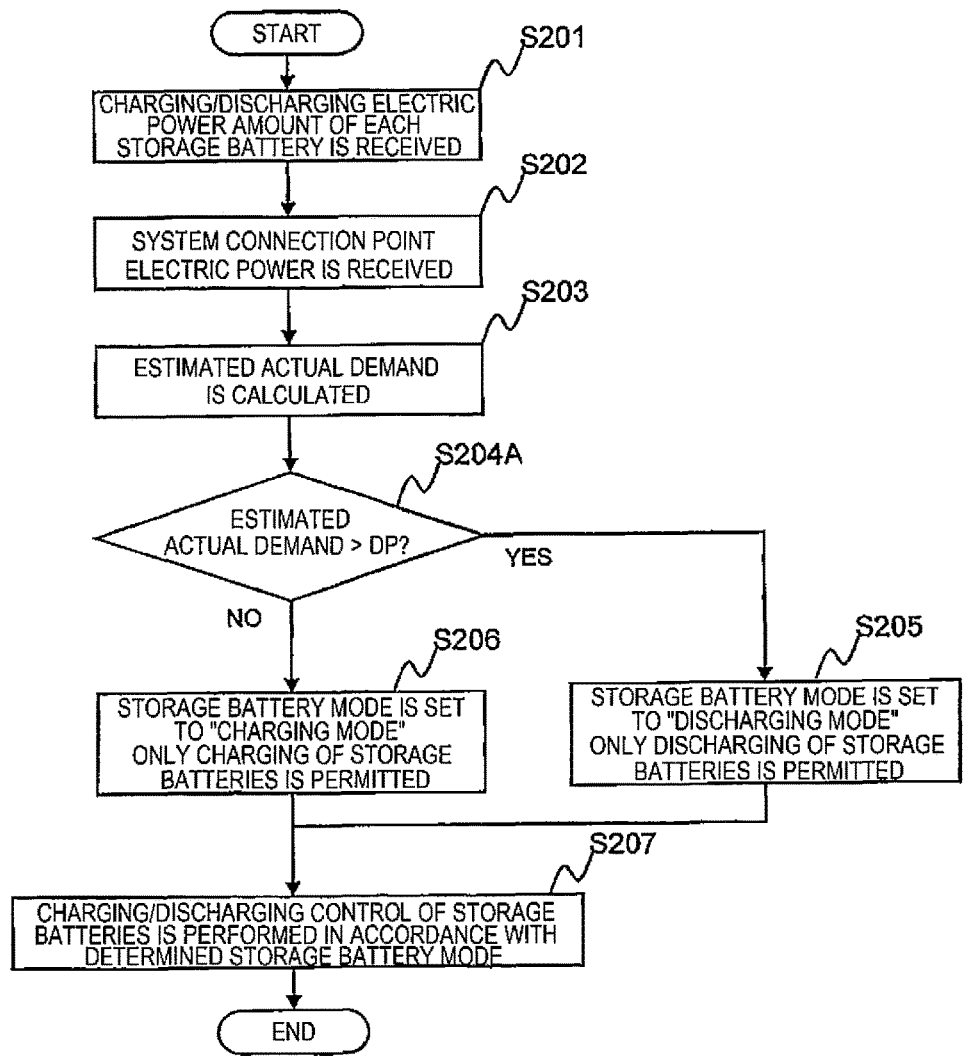

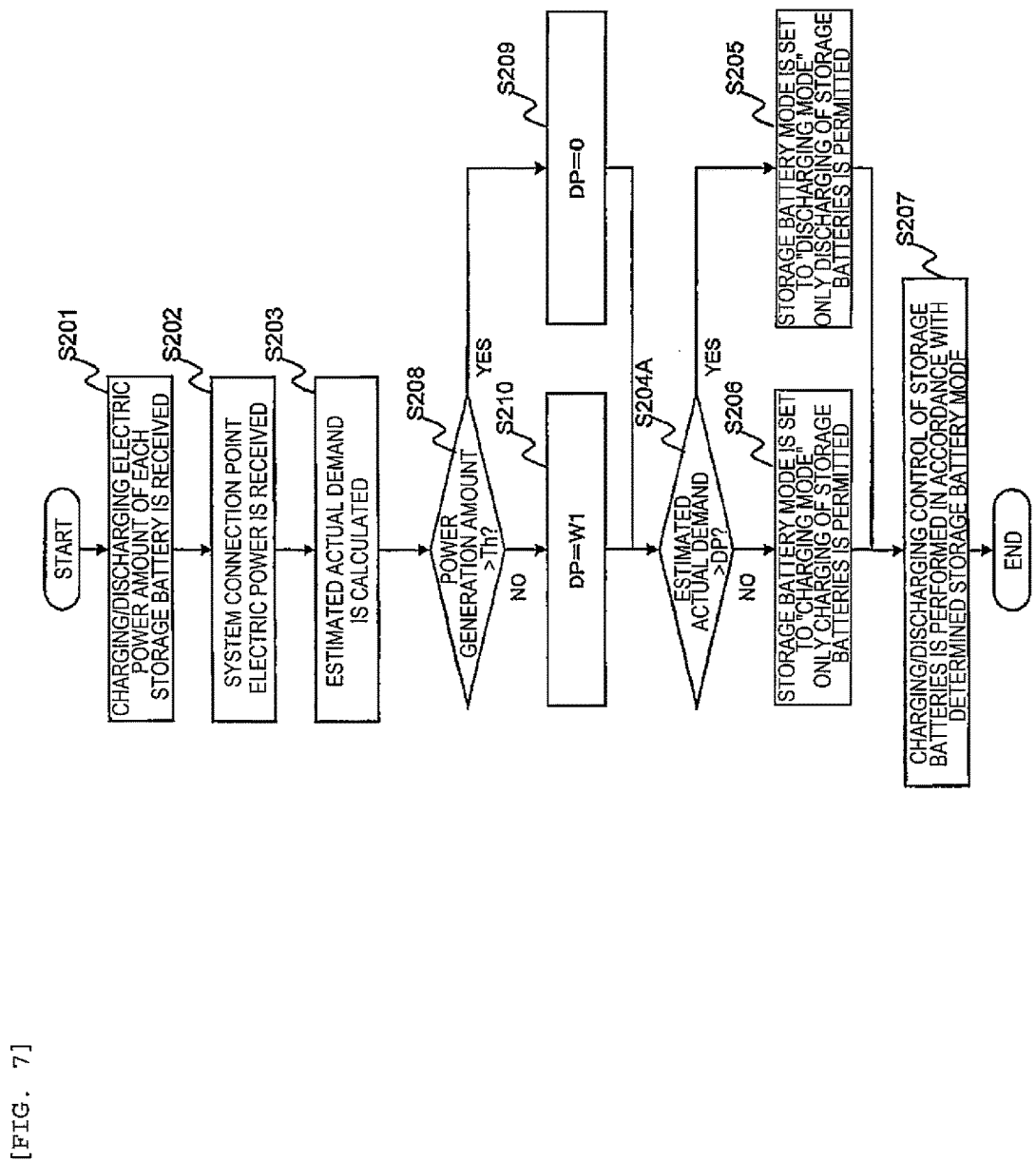
[FIG. 7]

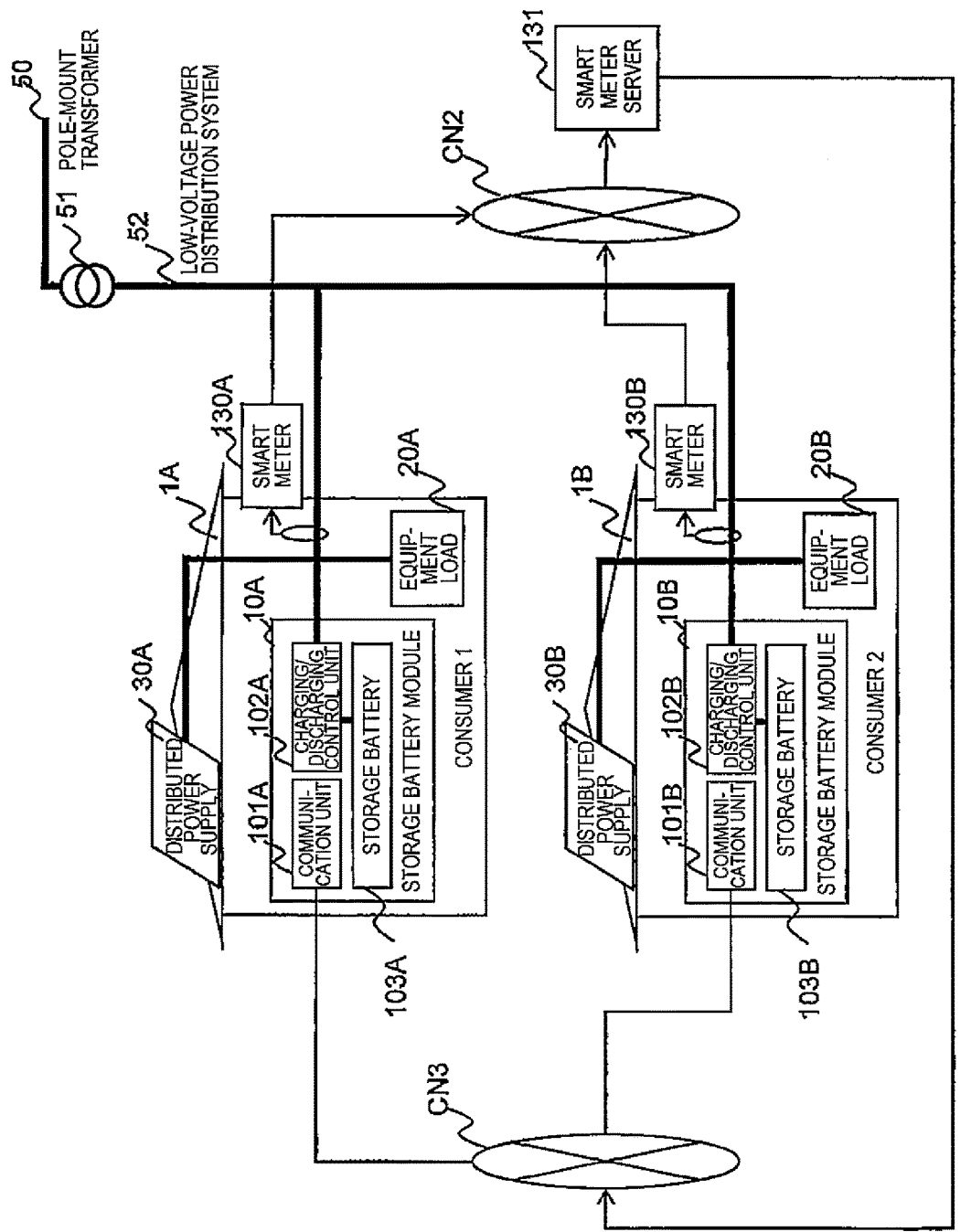
[FIG. 8]

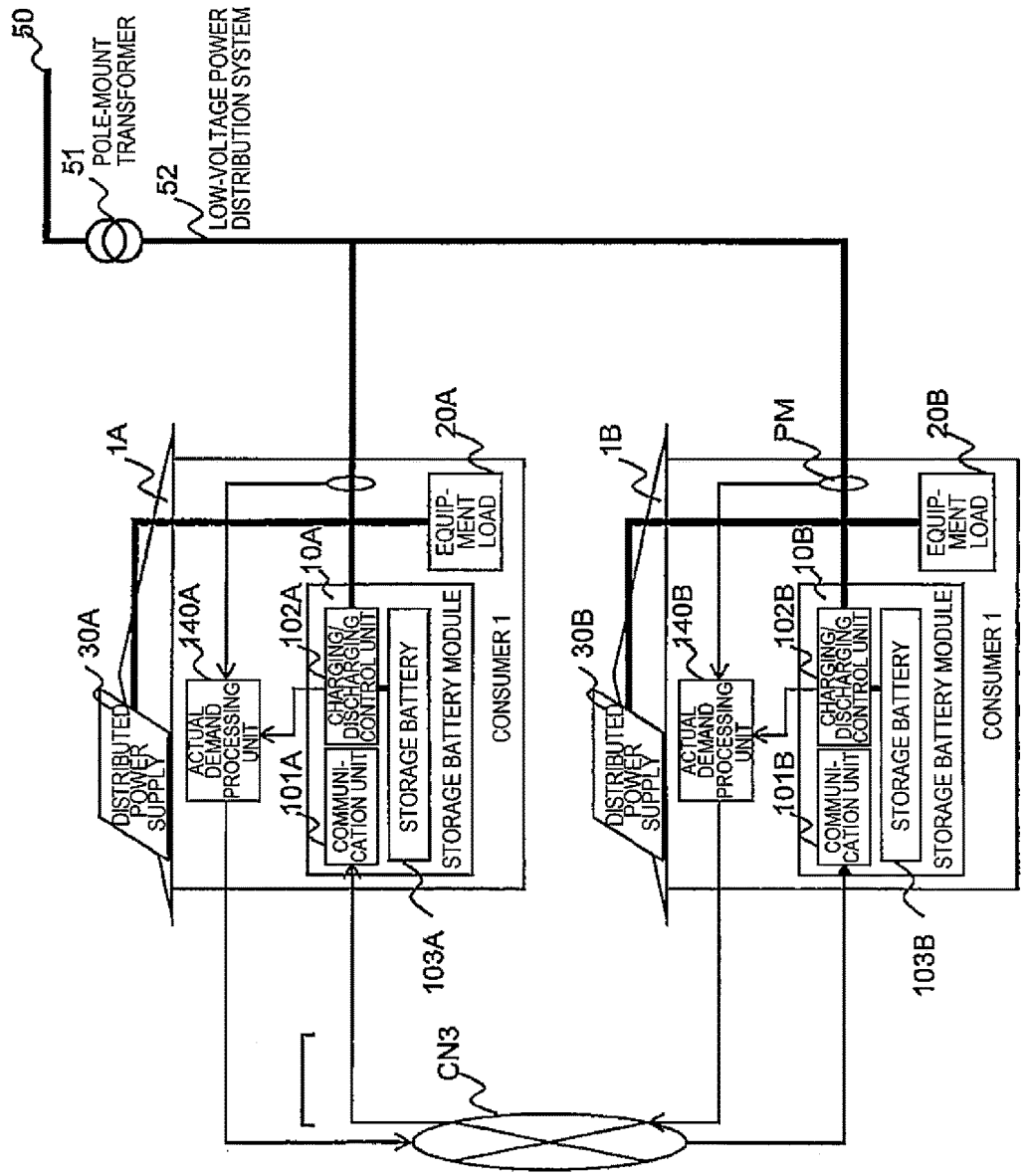
[FIG. 9]

STORAGE BATTERY CONTROL DEVICE AND STORAGE BATTERY CONTROL METHOD

TECHNICAL FIELD

The present invention relates to a storage battery control device and a storage battery control method.

BACKGROUND ART

In recent years, there has been proposed a system, which is a so-called microgrid in which a distributed power supply is provided to an electric power system in a particular area to meet most of demands for electric power in the area. In such a system, in order to maintain a balance between supply and demand of electric power, there is known a technique in which power storage equipment is provided and charging and discharging of a storage battery are controlled in accordance with a power flow from the electric power system (PTL 1).

There is also known, as another conventional art, a technique in which whether electric power generated from a solar power generator is sold to a system side or is stored in an energy storage device is switched in accordance with a state of voltage suppression that has been previously generated on the system side (PTL 2).

CITATION LIST

Patent Literatures

PTL 1: JP-A-2008-99527
PTL 2: JP-A-2011-172334

SUMMARY OF INVENTION

Technical Problems

There will be discussed a case where, in a case where a plurality of storage batteries are provided in a predetermined area, discharging in one storage battery and charging in another storage battery are simultaneously generated in the same amount. In this case, an electric power amount seems to be simply transferred from one storage battery to another storage battery. However, in fact, an electric power loss is caused at the time of charging, at the time of transmitting electric power, and at the time of discharging. The loss is, for example, a loss at the time of DC/AC conversion, a loss at the time of transmitting electric power, a loss at the time of AC/DC conversion, and a loss caused by an internal resistance of a storage battery at the time of charging. Energy corresponding to those electric power losses is wastefully consumed.

There is a possibility that the above-mentioned wasteful charging/discharging causes deterioration of properties of the storage batteries and shorten a lifetime of the storage batteries.

An object of the invention is to provide a storage battery control device and a storage battery control method which can suppress wasteful charging/discharging among a plurality of storage batteries provided in an electric power system.

Solution to Problems

In order to solve the problems, a storage battery control device according to the invention, which is a device for controlling charging/discharging of a storage battery, is provided in each of a plurality of storage batteries connected to an electric power system and has a function of communicating with another storage battery control device via network connection, a function of controlling charging and discharging of the corresponding storage battery, and a function of acquiring information on a linkage point power flow in the electric power system.

The storage battery control device can acquire charging/discharging electric power amounts of the respective storage batteries connected to the electric power system and data of the linkage point power flow and can estimate a demand for electric power in the electric power system on the basis of the charging/discharging electric power amounts and the data of the linkage point power flow.

The storage battery control device can control the corresponding storage battery by selecting which one of a charging mode and a discharging mode the storage battery is operated in by comparing a mode determination threshold that is prepared in advance to determine a mode of charging/discharging operation of the storage batteries on the basis of the demand for electric power and the demand for electric power with each other, and generating predetermined control information having a mode selected from the charging mode and the discharging mode.

At least a part of a configuration of the invention can be realized as a computer program or a hardware circuit. The computer program can be distributed via, for example, a communication medium such as Internet or a recording medium such as a hard disk or a flash memory device.

Advantageous Effects of Invention

The invention can suppress charging/discharging among a plurality of storage batteries provided in an electric power system. This makes it possible to reduce an electric power loss at the time of charging, at the time of transmitting electric power, and at the time of discharging, thereby energy can be effectively used.

BRIEF DESCRIPTION OF DRAWINGS

FIG. 1 is an entire system configuration view of a storage battery control device.
FIG. 2 is a flow chart showing processing for determining a control mode of a storage battery.
FIG. 3 is a flow chart showing processing for determining charging/discharging operation of the storage battery.
FIG. 4 shows a configuration example (Example 2) of a table for managing charging/discharging operation.
FIG. 5 shows a configuration example (Example 2) of a table for managing an electric power rate.
FIG. 6 is a flow chart (Example 3) of processing for determining a control mode of a storage battery.
FIG. 7 is a flow chart (Example 4) of processing for determining a control mode of a storage battery.
FIG. 8 is an entire configuration view (Example 5) of a storage battery control system.
FIG. 9 is an entire configuration view (Example 6) of a storage battery control system.

DESCRIPTION OF EMBODIMENT

Hereinafter, an embodiment of the invention will be described with reference to drawings. A storage battery control module 110 of this embodiment is connected to an electric power system and includes a storage battery 112 and a storage battery control device 111, as described in detail below. The storage battery control device 111 includes a communication unit for transmitting/receiving data via a network and a charging/discharging control unit for calculating a demand for electric power in a predetermined consumer 1 in which the storage battery module is provided and controlling charging/discharging of the storage battery 112 on the basis of the demand for electric power in the consumer 1, and therefore the storage battery control device 111 can control a charging/discharging electric power amount of the storage battery.

EXAMPLE 1

Example 1 will be described with reference to FIG. 1 to FIG. 3. FIG. 1 illustrates a configuration of an electric power system on a low-voltage system side in the predetermined consumer 1.

For example, the consumer 1, such as a general individual house, an apartment house, a commercial building, an office building, or a factory, includes the storage battery modules 110, an equipment load 20, and a distributed power supply 30. The storage battery modules 110, the equipment load 20, and the distributed power supply 30 are connected to a low-voltage side electric power system 41 via a consumer distribution line 42. The low-voltage side electric power system 41 is connected to, for example, a transformer such as a pole-mount transformer 40.

The equipment load 20 is a device that consumes electric power. In a case of, for example, housing, the equipment load is an illumination device, an air conditioner, a refrigerator, a washing machine, a television device, an acoustic device, a water heater, or the like. In a case of a factory or the like, the equipment load 20 is, for example, a machine tool, an electric motor, a robot, or an elevator.

The distributed power supply is a device for generating electric power. The distributed power supply can be, for example, a solar power generator, a fuel cell, a cogeneration system, or a diesel private power generator.

A system connection point electric power meter 120 measures an electric power value at a connection point between the distribution line 42 in the consumer 1 and the low-voltage side system 41. The system connection point electric power meter 120 is connected to a network CN1 and transmits the measured connection point electric power measurement value to the storage battery module 110. As the system connection point electric power meter 120, an electric power meter (including smart meter) provided in the consumer 1 by an electric power company may be used.

The storage battery control module 110 is a device including a set of a power storage control device for managing a storage battery and charging/discharging of the storage battery and a communication unit for communicating with outside. In this example, it is assumed that a plurality of storage battery modules 110(1) to 110(3) are connected to the consumer distribution line 42. Those storage battery modules 110(1) to 110(3) are connected to one another via the communication network CN1.

Although three storage battery modules 110(1) to 110(3) are illustrated in FIG. 1, two, four, or five or more storage battery modules may be included in the consumer 1. In a case where the storage battery modules 110(1) to 110(3) are not particularly discriminated from one another, the storage battery modules 110(1) to 111(3) are referred to as "storage battery module 110".

A communication unit 1111 is a circuit for communicating with another storage battery module or the like via the communication network CN1. The communication network CN1 is a network via which the storage battery modules 110 communicate and is configured as, for example, a wireless communication network, PLC (Power Line Communications), a wireless or wired LAN (Local Area Network), and a PHS (Personal Handy-phone System).

The communication unit 1111 receives storage battery charging/discharging information described below from each of the other storage battery modules 110 via the communication network CN1. The communication unit 1111 receives the connection point electric power measurement value from the system connection point electric power meter 120 via the communication network CN1. The communication unit 1111 transfers the received connection point electric power measurement value to a charging/discharging control unit 1112. The communication unit 1111 acquires the storage battery charging/discharging information from the charging/discharging control unit 1112 and transmits the storage battery charging/discharging information to each of the other storage battery modules via the communication network CN1. The communication unit 1111 can also transmit a remaining battery capacity (power storage capacity) or the like described below to the other storage battery modules 110 via the communication network CN1.

The storage battery 112 is formed by connecting a plurality of cells having an electrode and electrolyte. The storage battery 112 is constituted of, for example, a lithium ion storage battery, a lead storage battery, a nickel.hydrogen storage battery, and a sodium.sulfur storage battery. The storage battery module 110 may include not only the storage battery 112 but also a device such as an electric double-layered capacitor or a lithium ion capacitor.

The charging/discharging control unit 1112 is a control circuit for controlling charging of the storage battery 112 and discharging of the storage battery 112. The charging/discharging control unit 112 can include, for example, an inverter circuit and a microcomputer circuit.

At the time of charging, the charging/discharging control unit 1112 converts AC power from the low-voltage side system 41 into DC power to thereby charge the storage battery 112. At the time of discharging, the charging/discharging control unit 1112 converts the DC power of the storage battery 112 into AC power and supplies the AC power to the low-voltage side system 41.

The charging/discharging control unit 1112 measures, as the storage battery charging/discharging information, a charging electric power amount to the storage battery 112 and a supplying electric power amount to the low-voltage side system 41 (discharging electric power amount from the storage battery 112), and the measured storage battery charging/discharging information can be transmitted to the other storage battery modules 110(1) to (3) from the communication unit 1111 via the network CN1.

The charging/discharging control unit 1112 causes the storage battery 112 to be charged or discharged in accordance with the storage battery charging/discharging information of the other storage battery modules received from the communication unit 1111 and the connection point electric power measurement value of the system connection point electric power meter. The charging/discharging control unit 1112 manages the power storage capacity (current remaining battery capacity, an SoC (State of Charging)) of the storage battery 112.

Processing in which the charging/discharging control unit 1112 controls charging/discharging of the storage battery 112 will be described with reference to FIG. 2.

The communication unit 1111 acquires a charging/discharging electric power amount of each of the other storage battery modules 110 (S201). This processing is regularly executed at predetermined intervals. The communication unit 1111 tramits the acquired charging/discharging electric power amount of each of the storage battery modules 110 to the charging/discharging control unit 1112. Note that, as to the charging/discharging electric power amount of each of the storage battery modules 110, a charging electric power is treated as a negative value and a discharging electric power is treated as a positive value. As a method of acquiring the charging/discharging electric power amount from each of the storage battery modules 110, for example, there is a method in which the storage battery module 110 transmits a charging/discharging electric power amount at predetermined time intervals and the communication unit 1111 receives the charging/discharging electric power amount. The charging/discharging electric power amount is an electric power amount for charging/discharging the storage battery that is to be charged/discharged at a predetermined point in time or is being charged/discharged.

In this example, for example, in a case of the method in which the storage battery module 110 transmits the charging/discharging electric power amount at the predetermined time intervals, an actual charging/discharging electric power amount at the time of execution of transmission is transmitted.

The communication unit 1111 acquires an electric power measurement value at the system connection point from the system connection point electric power meter 120 and transmits the acquired system connection point electric power to the charging/discharging control unit 1112 (S202).

Herein, a case where electric power is supplied to the consumer 1 from the low-voltage side system 41, i.e, a case of a so-called forward power flow is treated as a positive value, whereas a case where electric power is supplied to the low-voltage side system 41 from the consumer 1, i.e., a case of a so-called backward power flow is treated as a negative value.

The charging/discharging control unit 1112 calculates a total value of the charging/discharging electric power amount of each of the storage battery modules acquired in Step S201 and the system connection point electric power amount acquired in Step S202 (S203). This total value is an actual-result value of demand for electric power (electric power value) consumed or generated by the consumer 1.

This actual electric power value is referred to as "estimated actual demand" in this example. In a case where the estimated actual demand is a positive value, a power consumption amount exceeds a power generation amount in the consumer 1, which means that the electric power is insufficient. In a case where the estimated actual demand is a negative value, the power generation amount exceeds the consumption amount in the consumer 1, which means that the electric power is excessive. In a case where a value of the estimated actual demand is zero, the power consumption amount and the power generation amount in the consumer 1 are the same, which means that supply and demand of the electric power are equal to each other.

The charging/discharging control unit 1112 determines whether the estimated actual demand is 0 or larger (S204). In a case where the estimated actual demand is larger than 0 (S204: Yes), the processing proceeds to Step S205. In a case where the estimated actual demand is not larger than 0 (S204: No), the processing proceeds to Step S206.

In a case where the estimated actual demand is larger than 0, electric power is insufficient (load is applied) in the consumer 1, a "discharging mode" is selected (S205). On the contrary, in a case where the estimated actual demand is not larger than 0, electric power is sufficient or the electric power is excessive in the consumer 1, and therefore a "charging mode" is selected (S206).

Herein, the discharging mode is a mode in which discharging of the storage battery 112 is controllable. The charging mode is a mode in which charging of the storage battery 112 is controllable. More specifically, the discharging mode is a mode in which charging control of the storage battery 112 is prohibited and discharging control thereof or control of not charging/discharging the storage battery 112 can be carried out.

The charging mode is a mode in which the discharging control of the storage battery 112 is prohibited and the charging control thereof or the control of not charging/discharging the storage battery 112 can be carried out. The discharging mode can be defined as a mode for prohibiting charging, and the charging mode can be defined as a mode for prohibiting discharging.

The charging/discharging control unit 1112 carries out the charging/discharging control of the corresponding storage battery 112 in accordance with a storage battery control mode selected in Step S205 or Step S206 (S207).

FIG. 3 is a flow chart showing operation of the storage battery module 110. This processing is executed by the charging/discharging control unit 1112 of the storage battery control device 111. However, in order to easily understand description, the description will be made by treating a subject of the operation as the storage battery module 110.

In a case where the storage battery control mode is determined in the charging/discharging control unit 1112 of the storage battery control device 111 (S301), the storage battery module 110 acquires the SoC of the storage battery 112 (S302).

The storage battery module 110 determines control of the storage battery 112 (S303) on the basis of the storage battery control mode and the SoC by referring to a charging/discharging operation management table T301 that has been stored in advance.

The charging/discharging operation management table T301 is a table for determining charging/discharging operation of the storage battery 112 and has, for example, a mode column C301, an SoC column C302, and an operation column C303. The mode column C301 stores a value of the charging/discharging control mode. As described above, as a mode value, there is the charging mode or the discharging mode. In the SoC column C302, the SoC of the storage battery 112 is stored. In the operation column C303, operation of the storage battery 112 is stored. The operation of the storage battery is charging, discharging, or nothing (In a case of nothing, "−" is set).

In a case where the storage battery control mode is the charging mode and the SoC is larger than a predetermined value, the storage battery 112 does not do anything. In this case, the storage battery 112 already stores sufficient electrical energy, and therefore it is unnecessary to charge the storage battery 112. Because the charging mode is specified, discharging of the storage battery 112 is prohibited. Therefore, in the storage battery module 110, in a case where the charging mode is specified and the SoC is larger than the predetermined value, the storage battery 112 is not charged or discharged but waits. In a case where the storage battery control mode is the charging mode and the SoC is equal to or less than the predetermined value, the storage battery 112 is charged. This is because, in the charging mode, charging is permitted and sufficient electrical energy is not stored in the storage battery 112. Therefore, the storage battery module 110 stores, in the storage battery 112, electric power generated in the distributed power supply 30 or electric power from the low-voltage side system 41.

In a case where the storage battery control mode is the discharging mode and the SoC is larger than the predetermined value, the storage battery 112 is discharged. This is because, in the discharging mode, discharging is permitted and sufficient electrical energy is stored in the storage battery 112. The electric power discharged from the storage battery 112 is supplied to the equipment load 20.

In a case where the storage battery control mode is the discharging mode and the SoC is equal to or less than the predetermined value, the storage battery 112 is not charged or discharged but waits. This is because, in the discharging mode, discharging is permitted, but sufficient electrical energy is not stored in the storage battery 112.

In this example, as described above, the storage battery module 110 estimates an actual demand of the consumer 1, and, as the storage battery control mode, the charging mode is selected in a case where electric power is excessive and the discharging mode is selected in a case where electric power is insufficient. Then, the storage battery 112 is controlled in accordance with the storage battery control mode and the SoC.

In a case where the storage battery control mode is "discharging mode", the storage battery module 110 in which the storage battery 112 is being charged stops charging. Therefore, in the consumer 1, there are only the storage battery module 110 that carries out discharging and the storage battery module 110 that does not carry out charging or discharging. This makes it possible to suppress a phenomenon in which charging and discharging are simultaneously carried out among the storage battery modules 110(1) to 110(3) connected to the common consumer distribution line 42.

In a case where the storage battery control mode is the "charging mode", the storage battery module 110 in which the storage battery 112 is being discharged stops discharging. Therefore, in the consumer 1, there are only the storage battery module 110 that carries out charging and the storage battery module 110 that does not carry out charging or discharging. This makes it possible to suppress a phenomenon in which charging and discharging are simultaneously carried out among the storage battery modules 110(1) to 110(3) connected to the common consumer distribution line 42.

Therefore, according to this example, it is possible to suppress generation of wasteful electric power transfer in which electric power discharged from one storage battery module 110 is used to charge another storage battery module 110, effectively use the storage battery modules 110, and improve usability. Further, in this example, wasteful charging/discharging can be suppressed, and therefore shortening of a lifetime of the storage battery modules 110(1) and 110(2) can be suppressed.

Note that, in this example, a case of carrying out the processing for generating the storage battery control mode (FIG. 2) at the predetermined intervals has been described. Alternatively, the storage battery control device 111 of each of the storage battery modules 110 may carry out generation processing of the storage battery control mode in a case where a value of the charging/discharging electric power amount in any one of the storage battery modules 110(1) to 110(3) is changed.

In other words, the storage battery control device 111 records, in a memory, the charging/discharging electric power amounts that have been lastly transmitted by the storage battery modules 110(1) to 110(3). Then, in a case where a charging/discharging electric power amount transmitted by a certain storage battery module 110 is received, the processing of FIG. 2 is started by treating such reception as a trigger. At the time of the processing, a total value of the latest charging/discharging electric power amount received from the certain storage battery module 110 and the charging/discharging electric power amounts (values recorded in the memory) of the other storage battery modules 110 can be used as total electric power of the storage batteries.

With this configuration, even in a case where the storage battery modules 110 have different processing intervals, the storage battery control mode can be generated.

There is a possibility that the storage battery modules 110 transmit the charging/discharging electric power amounts to other storage battery modules 110 at different intervals. Therefore, by using the memory for storing the last charging/discharging electric power amounts received from the storage battery modules 110(1) to 110(3), charging/discharging control information is generated at a timing at which any one of the storage battery modules 110 transmits a latest charging/discharging electric power amount.

EXAMPLE 2

Example 2 will be described with reference to FIG. 4 and FIG. 5. The following examples including this example correspond to modification examples of Example 1. Therefore, differences between Example 1 and the following examples will be mainly described. In this example, the charging/discharging operation can be determined by also referring to an electric power rate.

The electricity rate is differently set depending on, for example, a time zone or a season in some cases. In this example, for the sake of easy explanation, the rate is set in each time zone, and an example where evaluation is carried out in a case where the rate is high and in a case where the rate is low will be described.

FIG. 5 is an example of an electric power rate management table T501 for use in the storage battery control device 111 in this example. The electric power rate management table T501 has, for example, a time zone column C501, a rate column C502, and an evaluation column C503. The time zone column C501 stores a time zone in which electric power is consumed. The rate column C502 stores a unit price of the electric power rate in the time zone. In the evaluation column C503, an evaluation result of the electric power rate is stored. Herein, a case where the evaluation result is a high rate means that the electric power rate is higher than a reference rate that has been determined in advance. Similarly, a case where the evaluation result is a low rate means that the electric power rate is equal to or less than the reference rate that has been determined in advance. Therefore, evaluation at the reference rate of, for example, 15 yen/kWh in a time zone shown in C501 is shown in C503.

In the storage battery control device 111 of this example, in determination processing of the charging/discharging operation (S303), evaluation of the electric power rate at a time at which the charging/discharging operation is determined is determined by referring to the electric power rate management table T501. The evaluation of the rate described above is merely an example, and this example has described a case of discriminating two states, i.e., a case where the rate is high and a case where the rate is low. However, three or more states may be discriminated and managed.

FIG. 4 is an example of a charging/discharging operation management table T401 for use in the storage battery control device 111 of this example. The storage battery control device 111 can determine the operation of the storage battery 112 on the basis of the mode value specified in the storage battery control mode, the evaluation of the electric power rate, and the SoC of the storage battery 112.

The charging/discharging operation management table T401 has, for example, a mode column C401, an SoC column C402, an electricity rate evaluation column C403, and an operation column C404. The mode column C401 stores a value of the storage battery control mode. As the mode value, there is the charging mode or the discharging mode.

In the SoC column C402, the SoC of the storage battery 112 is stored. In this example, the SoC is managed by discriminating four states thereof. A first state (F) is a state in which, for example, 80% or more of electrical energy (electric power) is stored in the storage battery 112. A second state (H) is a state in which, for example, 50% or more but less than 80% of electrical energy is stored in the storage battery 112. A third state (L) is a state in which, for example, 20% or more but less than 50% of electrical energy is stored in the storage battery 112. A fourth state (E) is a state in which, for example, less than 20% of electrical energy is stored in the storage battery 112. The above numerical value ranges are merely an example, and numerical value ranges are not limited to the above-mentioned numerical value ranges. Although a case where four states are discriminated has been described, three or five or more states may be discriminated and managed.

In the electricity rate evaluation column C403, evaluation corresponding to the rate is stored. In this example, the rate is evaluated to be one of two states, i.e., a case where the electricity rate is high and a case where the electricity rate is low.

In the operation column C404, the operation of the storage battery 112 is stored. The operation of the storage battery is charging, discharging, or nothing (In a case of nothing, "−" is set). In a case of the charging operation, it is possible to specify how much the storage battery is charged. Also in a case of the discharging operation, it is possible to specify how much the storage battery is discharged. The term "charging (to F)" in FIG. 4 means that the storage battery is charged until the SoC becomes the first state (F) from the current state. The term "discharging (to E)" means that the storage battery is discharged until the SoC becomes the fourth state (E) from the current state.

In a case where the charging mode is specified and the SoC is the first state (F), the storage battery 112 is not charged or discharged but waits, regardless of high/low of the electricity rate. This is because the storage battery 112 already stores sufficient electrical energy.

In a case where the charging mode is specified, the SoC is the second state (H), and the electricity rate is high, the storage battery 112 waits without doing anything. Although the storage battery 112 can be charged, charging is not carried out because the electricity rate is high.

In a case where the charging mode is specified, the SoC is the second state (H), and the electricity rate is low, the storage battery 112 is charged until the first state (F). By storing electric power at a low rate as much as possible, a user's economic burden can be reduced.

In a case where the charging mode is specified, the SoC is the third state (L), and the electricity rate is high, the storage battery 112 waits without doing anything. Although the storage battery 112 can be charged, charging is not carried out because the electricity rate is high.

In a case where the charging mode is specified, the SoC is the third state (L), and the electricity rate is low, the storage battery 112 is charged until the first state (F). Electric power at a low electricity rate is stored as much as possible.

In a case where the charging mode is specified, the SoC is the fourth state (E), and the electricity rate is high, the storage battery 112 is charged until the third state (L). Because the electricity rate is high, only essential electric power is stored.

In a case where the charging mode is specified, the SoC is the fourth state (E), and the electricity rate is low, the storage battery 112 is charged until the first state (F). This is to store electric power at a low electricity rate as much as possible.

In a case where the discharging mode is specified and the SoC is the first state (F), the storage battery 112 is discharged until the fourth state (E), regardless of high/low of the electricity rate. By discharging while the electricity rate is being high, a user's economic burden can be reduced. This is because a user does not need to use electricity at a high rate.

In a case where the discharging mode is specified, the SoC is the second state (H), and the electricity rate is high, the storage battery 112 is discharged until the fourth state (E). This is to reduce a user's economic burden by reducing an electric power amount purchased from the system as much as possible while the electricity rate is being high, as in the above case.

In a case where the discharging mode is specified, the SoC is the second state (H), and the electricity rate is low, the storage battery 112 waits without doing anything. Although discharging can be carried out because relatively sufficient electrical energy is stored, discharging is not carried out because the electricity rate is low. Discharging in a time zone in which the electricity rate is higher is more economically beneficial for a user.

In a case where the discharging mode is specified, the SoC is the third state (L), and the electricity rate is high, the storage battery 112 is discharged until the fourth state (E). This is to reduce a user's economic burden by discharging the storage battery 112 as much as possible while the electricity rate is being high.

In a case where the discharging mode is specified, the SoC is the third state (L), and the electricity rate is low, the storage battery 112 does not do anything. Discharging in a time zone in which the electricity rate is higher is more economically beneficial for a user in comparison with discharging in a time zone in which the electricity rate is lower, as in the above case.

In a case where the discharging mode is specified and the SoC is the fourth state (E), the storage battery 112 does not do anything, regardless of high/low of the electricity rate. This is because the charging operation is prohibited in the discharging mode and the storage battery 112 has substantially no remaining capacity.

This example configured as described above also has an effect similar to that of Example 1. Further, in this example, each storage battery control device 111 can determine the operation of the storage battery 112 also in consideration of the electricity rate, thereby improving usability for a user.

EXAMPLE 3

Example 3 will be described with reference to FIG. 6. In this example, a value other than 0 is used as a mode determination threshold DP that is used to select any one of the charging mode and the discharging mode.

FIG. 6 is a flow chart showing storage battery charging/discharging control processing according to this example. In this processing, the estimated actual demand is compared with the mode determination threshold DP. As the mode determination threshold DP, for example, a transfer average value of previous actual-result values of the consumer 1 can be used.

With this, in a case where the estimated actual demand is larger than the threshold DP (S204A: Yes), the discharging mode is selected (S205), meanwhile, in a case where the estimated actual demand is not larger than the threshold DP (S204A: No), the charging mode is selected (S206).

Therefore, according to this example, even in a case where the consumer 1 does not include the distributed power supply 30, an electric power value at a system linkage point of the consumer can be controlled to become a value around the threshold DP.

Because Example 1 has been described assuming that the consumer 1 includes the distributed power supply, the mode value is selected depending on whether or not the estimated actual demand in the consumer 1 is larger than 0. However, in a case where the consumer does not include the distributed power supply 30, excessive electric power is not generated, and therefore the storage battery module 110 is always operated in the discharging mode.

In view of this, in this example, the storage battery module 110 is operated by setting a value other than 0 as the threshold DP that is used to determine which one of the charging mode and the discharging mode is selected. For example, in a case where a certain threshold such as 10 kWh is set, electric power at the system linkage point can be controlled to have a value around the threshold DP by charging/discharging the storage battery 112. Preferably, by using, as the threshold DP, the transfer average value of the previous actual-result values of the estimated actual demand, a change in electric power at the system linkage point can be controlled to be reduced.

EXAMPLE 4

Example 4 will be described with reference to FIG. 7. In this example, a value of the mode determination threshold DP is controlled in accordance with a power generation amount of the distributed power supply 30.

FIG. 7 is a flow chart showing storage battery charging/discharging control processing according to this example. When calculating the estimated actual demand (S203), the storage battery control device ill determines whether or not the power generation amount of the distributed power supply 30 exceeds a power generation amount threshold Th (S208). Although not shown in FIG. 7, the storage battery control device ill is configured to directly or indirectly acquire the power generation amount of the distributed power supply 30.

In a case where the power generation amount of the distributed power supply 30 exceeds the threshold Th (S208: Yes), the storage battery control device 111 sets 0 as the value of the mode determination threshold DP (S209). In a case where the power generation amount of the distributed power supply 30 does not exceed the threshold Th (S208: No), the storage battery control device 111 sets a predetermined value W1 (>0) as the value of the mode determination threshold DP (S210).

This example configured as described above also has an effect similar to that of Example 2. Further, in this example, in a case where the power generation amount of the distributed power supply 30 exceeds the threshold Th, the value of the mode determination threshold DP is set to 0, meanwhile, in a case where the power generation amount of the distributed power supply 30 does not exceed the threshold Th, the value of the mode determination threshold DP is set to W1.

Therefore, in this example, charging/discharging control of the storage battery module 110 can be changed between a case where the distributed power supply 30 is provided and the power generation amount exceeds the threshold Th and a case where the distributed power supply 30 is not provided or the distributed power supply 30 cannot sufficiently generate electric power. For example, even in a case where the distributed power supply 30 is easily influenced by weather, such as a solar power generator or a wind power generator, the plurality of storage battery modules 110 can be appropriately managed. Further, even in a case where the distributed power supply 30 is a fuel cell, a cogeneration system, or a diesel private power generator or in a case where power generation capability is decreased or is lost due to out of fuel, a malfunction, or the like, each storage battery module 110 can be appropriately controlled.

EXAMPLE 5

Example 5 will be described with reference to FIG. 8. In this example, the charging/discharging operation is configured to be controlled by managing, as the same group, storage battery modules 10A, 10B included in a plurality of consumers 1A, 1B, respectively.

Although FIG. 8 illustrates two consumers 1A, 1B, this example can be also applied to three or more consumers. The consumer 1A includes, for example, an equipment load 20A, a distributed power supply 30A, the storage battery module 10A, and a smart meter 130A. The smart meter 130A herein means an electric power meter having at least a communication function. The other consumer 1B, as well as the consumer 1A, includes an equipment load 20B, a distributed power supply 30B, the storage battery module 10B, and a smart meter 130B.

The consumers 1A, 1B are connected to a pole-mount transformer 51 via a low-voltage power distribution system 52 and are connected to a high-voltage power distribution system 50 via the pole-mount transformer 51. The consumers 1A, 1B are configured such that the storage battery modules 10A, 10B provided in the consumers are connected to perform two-way communication via a communication network CN3. The smart meters 130A, 130B are connected to a smart meter server 131 via a communication network CN2. The smart meter server 131 collects electric power usage amounts in the respective consumers measured by the smart meters 130A, 130B of the respective consumers and transmits the electric power usage amounts in the respective consumers to the storage battery modules of the respective consumers via the communication network CN3. The communication networks CN2, CN3 may be configured by, for example, a wireless LAN, PLC, optical communication, or Internet.

In FIG. 8, each of the consumers includes a single storage battery module, but each of the consumers may include two or more storage battery modules.

The smart meter server 131 is provided to collect the electric power usage amounts in the respective consumers in order that, for example, an electric power company calculates an electric power rate. In that case, the communication network CN2 is configured by a private network of the electric power company and the communication network CN3 is configured by Internet.

The storage battery modules 10A, 10B include communication units 101A, 101B, charging/discharging control units 102A, 102B, and storage batteries 103A, 103B, respectively.

Each of the communication units 101A, 101B is a circuit for communicating with another storage battery module or the like via the communication network CN2. The communication network CN2 is a network that allows the storage battery modules to communicate and is, for example, a wireless communication network, PLC (Power Line Communications), a wireless or wired LAN (Local Area Network), or a PHS (Personal Handy-phone System).

The communication units 101A, 101E receive storage battery charging/discharging information described below from each other via the communication network CN2. The communication units receive electric power consumption measurement values of the consumers from the smart meter server 131 via the communication network CN2. The communication units 101A, 101B transfer the received electric power consumption measurement values of the consumers to the charging/discharging control units 102A, 102B, respectively. Further, the communication units 101A, 101B acquire the storage battery charging/discharging information from the charging/discharging control units 102A, 102B, respectively, and transmit the storage battery charging/discharging information to the other storage battery module via the communication network CN2.

The storage batteries 103A, 103B are storage batteries that have the same function as the storage battery 112 illustrated in FIG. 1 and can be charged/discharged with electric power.

The charging/discharging control units 102A, 102B are control circuits that have the same function as the charging/discharging control unit 1112 illustrated in FIG. 1 and control charging of the respective storage batteries 103A, 103B and discharging of the respective storage batteries 103A, 103B. Each of the charging/discharging control units 102A, 102B can include, for example, an inverter circuit and a microcomputer circuit.

At the time of charging, the charging/discharging control units 102A, 102B convert AC power from the low-voltage power distribution system 52 into DC power to charge the storage batteries 103A, 103B, respectively. At the time of discharging, the charging/discharging control units 102A, 102B convert the DC power in the respective storage batteries 103A, 103B into AC power and supplies the AC power to the low-voltage side system 51.

The charging/discharging control units 102A, 102B measure, as the storage battery charging/discharging information, charging electric power amounts to the respective storage batteries 103A, 103B and supplying electric power amounts to the low-voltage side system 51 (discharging electric power amounts from the storage batteries 102A, 102B), and the measured storage battery charging/discharging information can be transmitted to the other storage battery modules 10B, 10A from the communication units 101A, 101B via the network CN2.

The charging/discharging control unities 102A, 102B cause the respective storage batteries 103, 103B to be charged or discharged in accordance with the storage battery charging/discharging information of the other storage battery modules received from the communication units 101A, 1013 and a consumer total power consumption amount transmitted from the smart meter server described below. The charging/discharging control units 102A, 102B manage the power storage capacities (current remaining battery capacities, SoCs (States of Charging)) of the storage batteries 103A, 103B, respectively.

The smart meter server 131 receives, via the communication network CN2, the power consumption amounts of the respective consumers transmitted from the smart meters 130A, 130B provided in the respective consumers 1A, 1B, and calculates the consumer total power consumption amount that is a total value of the received power consumption of the respective consumers. Then the smart meter server 131 transmits the value to the storage battery modules of the consumers via the network CN3.

The charging/discharging control units 102A, 102E determine the charging/discharging modes of the storage batteries by using, as the estimated actual demand, a difference obtained by subtracting the charging/discharging electric power of the storage battery modules from the consumer total power consumption amount and implement the charging/discharging control of the storage batteries. A charging/discharging control method of the storage batteries is similar to that of, for example, Example 1.

In this example, the charging/discharging operation of the storage battery modules 10A, 10E provided in different consumers is controlled in the same way as Example 1. With this, in this example, a plurality of storage battery modules can be appropriately controlled between consumers in a group.

EXAMPLE 6

Example 6 will be described with reference to FIG. 9. In this example, the charging/discharging operation can be controlled in the same way as Example 5 by grouping a plurality of storage battery modules 10A, 10B separately provided between consumers. In Example 5, after the smart meter server 131 acquires the electric power usage amounts in the consumers 1A, 1B from the smart meters 130A, 130B provided in the consumers 1A, 1B, the smart meter server 131 calculates the consumer total power consumption amount and transmits the value to the storage battery modules 10A, 10B of the respective consumers. Further, the storage battery modules 10A, 10B calculate the estimated actual demand by transmitting the storage battery charging/discharging information to the other storage battery modules 10B, 10A.

Meanwhile, in this example, a total actual demand is calculated by calculating actual demands in the consumers 1A, 1B, transmitting the actual demands to the respective storage battery modules 10B, 10A, and summing up the actual demands of the consumers.

When comparing FIG. 9 and FIG. 8, the smart meter 130A is removed from the consumer 1A and an actual demand processing unit 140A is newly provided. Similarly, the smart meter 130B is removed from the consumer 1B and an actual demand processing unit 140B is provided.

The actual demand processing units 140A, 140B transmit the actual demands of the consumers 1A, 1B to the storage battery modules 10A, 10B, respectively, via the communication network CN3. Herein, the actual demand is a value obtained by subtracting, from used electric power in a consumer, storage battery charging/discharging electric power of a storage battery module of the consumer.

The actual demand processing units 140A, 140B receive the storage battery charging/discharging electric power from the storage battery modules 10A, 10B, respectively, and also receive the used electric power from electric power meters PM (the reference sign is only shown in the consumer 1B).

The electric power meters PM measure the used electric power in the consumers 1A, 1B, respectively, and transmit the measured used electric power to the actual demand processing units 140A, 140B, respectively.

This example is different from Example 5 in that the storage battery modules 10A, 10B do not transmit the storage battery charging/discharging electric power to the other storage battery modules 10B, 10A via the network CN3, but transmit the storage battery charging/discharging electric power to the actual demand processing units 140A, 140B provided in the respective consumers 1A, 1B.

Each of the actual demand processing units 140A, 140B is provided in the corresponding one of the consumers 1A, 1B.

In the actual demand processing units 140A, 140B, the actual demands are calculated by subtracting the storage battery charging/discharging electric power from the used electric power in the consumers in which the respective actual demand processing units are provided and are transmitted to the storage battery modules 10A, 10B via the network CN3.

Each of the storage battery modules 10A, 10B determines the charging/discharging mode of the storage battery by using a total actual demand that is a sum total of the actual demands of the consumers, instead of the estimated actual demand described in Example 1, and implements the charging/discharging control of the corresponding storage battery. A charging/discharging control method of the storage batteries is similar to, for example, Example 1.

This example configured as described above also has an effect similar to that of Example 5. Further, in this example, the actual demand processing units 140A, 140B are provided in the respective consumers 1A, 1B, and therefore the storage battery modules in the consumers can be controlled even in an environment in which so-called smart meters or a so-called smart meter server are/is not provided.

Note that the invention is not limited to the above-mentioned examples. A person skilled in the art can perform various additions, modifications, and the like within a scope of the invention.

REFERENCE SIGNS LIST 1, 1A, 1B: consumer
20, 20A, 20B: equipment load
30, 30A, 30B: distributed power supply
111: storage battery control device
110, 10A, 10B: storage battery module
1112, 102A, 102B: charging/discharging control unit
140A, 140B: actual demand processing unit

The invention claimed is:

1. A storage battery control device comprising:
a charging/discharging control unit configured to acquire a demand for electric power in a consumer to which a storage battery is provided; and
a communication unit configured to acquire a charging/discharging electric power amount of another storage battery provided to the consumer, wherein
the charging/discharging control unit is configured to control charging/discharging of the storage battery based on the charging/discharging electric power amount of the another storage battery and the demand for electric power in the consumer,
wherein the charging/discharging control unit is configured to manage a threshold value of an electric power amount of the storage battery to determine whether the charging/discharging control unit is to allow charging or discharging of the storage battery,
wherein:
when the threshold value is greater than the demand for electric power, the charging/discharging control unit is configured to allow charging of the storage battery and prohibit discharging; and
when the threshold value is less than or equal to the demand for electric power, the charging/discharging control unit is configured to prohibit charging of the storage battery and allow discharging.

2. The storage battery control device according to claim 1, wherein
the charging/discharging control unit is configured to acquire electric power flow data at a linkage point between the consumer and an electric power system; and
the charging/discharging control unit is configured to estimate the demand for electric power in the consumer based on the electric power flow data, the charging/discharging electric power amount of the another storage battery, and a charging/discharging electric power amount of the storage battery.

3. The storage battery control device according to claim 1, wherein
the charging/discharging control unit is configured to control charging/discharging of the storage battery based on a charge amount of the storage battery.

4. The storage battery control device according to claim 3, wherein
the charging/discharging control unit is configured to allow charging of the storage battery when the charge amount of the storage battery is less than or equal to a predetermined charge amount; and
the charging/discharging control unit is configured to prohibit charging of the storage battery when the charged amount of the storage battery is greater than the predetermined charged amount.

5. The storage battery control device according to claim 1, wherein
the charging/discharging control unit is configured to estimate the threshold value based on past demand for electric power in the consumer.

6. The storage battery control device according to claim 1, wherein
the charging/discharging control unit is configured to change the threshold value based on whether a power generation amount of a private power generator provided to the consumer exceeds the threshold value.

7. The storage battery control device according to claim 1, wherein
the charging/discharging control unit is configured to control charging/discharging of the storage battery based on information of an electricity rate at a time the charging/discharging control unit is determining whether to allow charging or discharging of the storage battery.

8. The storage battery control device according to claim 1, wherein
the communication unit is configured to transmit the charging/discharging electric power amount of the storage battery to another storage battery control device controlling the another storage battery.

9. A method for controlling charging/discharging of a storage battery, the method comprising:

acquiring, via a charging/discharging control unit, a demand for electric power in a consumer to which a storage battery is provided;

acquiring, via a communication unit, a charging/discharging electric power amount of another storage batter provided to the consumer;

controlling, via the charging/discharging control unit, charging/discharging of the storage battery, based on the charging/discharging electric power amount of the another storage battery and the demand for electric power in the consumer;

managing, via the charging/discharging control unit, a threshold value of an electric power amount of the storage battery to determine whether the charging/discharging control unit is to allow charging or discharging of the storage battery;

when the threshold value is greater than the demand for electric power, via the charging/discharging control unit, allowing charging of the storage battery and prohibiting discharging; and when the threshold value is less than or equal to the demand for electric power, via the charging/discharging control unit, prohibiting charging of the storage battery and allowing discharging.

* * * * *